United States Patent
Bauman et al.

(10) Patent No.: US 6,707,173 B2
(45) Date of Patent: Mar. 16, 2004

(54) LINEAR ACTUATOR FOR A POWERED VEHICLE LIFT GATE

(75) Inventors: Walter Douglas Bauman, Wixom, MI (US); Jack R. Roach, Florence, SC (US)

(73) Assignee: AVM, Incorporated, Marion, SC (US)

( * ) Notice: Subject to any disclaimer, the term of this patent is extended or adjusted under 35 U.S.C. 154(b) by 104 days.

(21) Appl. No.: 10/056,642

(22) Filed: Oct. 26, 2001

(65) Prior Publication Data

US 2003/0080632 A1 May 1, 2003

(51) Int. Cl.[7] .................................................. B60J 5/10
(52) U.S. Cl. ....................... 310/12; 296/56; 296/146.8
(58) Field of Search ............................. 310/12, 13, 14; 296/56, 146.8; 318/135

(56) References Cited

U.S. PATENT DOCUMENTS

| | | | |
|---|---|---|---|
| 5,712,516 A | * 1/1998 | Kabout | 310/12 |
| 5,872,344 A | 2/1999 | Durand et al. | 200/61.72 |
| 5,909,921 A | 6/1999 | Nesbeth | 296/100.1 |
| 5,921,604 A | 7/1999 | Yu et al. | 296/56 |
| 5,960,519 A | 10/1999 | Thompson et al. | 16/308 |
| 6,054,783 A | 4/2000 | Philipp et al. | 310/12 |
| 6,135,536 A | 10/2000 | Ciavaglia et al. | 296/146.4 |
| 6,150,740 A | 11/2000 | Slocum | 310/12 |
| 6,263,556 B1 | * 7/2001 | Stephan et al. | 29/428 |
| 6,268,667 B1 | * 7/2001 | Denne | 310/12 |
| 6,300,691 B1 | * 10/2001 | Hwang et al. | 310/12 |
| 2002/0069753 A1 | 6/2002 | Lauderbach et al. | 72/137 |

FOREIGN PATENT DOCUMENTS

| | | |
|---|---|---|
| DE | 29 20 750 A | 1/1991 |
| DE | 297 22 952 U1 | 6/1998 |
| EP | 1 072 747 A | 1/2001 |

OTHER PUBLICATIONS

European Search Report, dated Mar. 5, 2003.

* cited by examiner

*Primary Examiner*—Karl Tamai
*Assistant Examiner*—Judson H. Jones
(74) *Attorney, Agent, or Firm*—Carlson, Gaskey & Olds

(57) ABSTRACT

A power operating system for a vehicle liftgate includes an actuator having a gas strut and a linear electric motor mounted thereto along a common axis. By activating the linear electric motor, a slidable rotor moves along the linear stator to drive the gas spring between an extended position and a retracted position to provide remote operation of the liftgate. When power is unavailable to the linear electric motor, the liftgate may still be manually opened and closed in the conventional manner without the necessity of an override.

22 Claims, 2 Drawing Sheets

LINEAR ACTUATOR FOR A POWERED VEHICLE LIFT GATE

BACKGROUND OF THE INVENTION

The present invention relates to a vehicle liftgate and, more particularly, to a power actuator to remotely operate the vehicle liftgate.

Vans, station wagons, pick-ups, and sport-utility vehicles (SUVs) typically have rear doors, generically called tailgates, which provide access to the vehicle's rear cargo area through a rear opening. In some vehicles, pairs of doors are vertically hinged at the sides of the vehicle rear opening to open horizontally. In others, pairs of doors are horizontally hinged at the top and bottom of the rear opening to open vertically up and down like a clamshell. In yet other vehicles, a single door or liftgate is horizontally hinged at the top of the opening to open upwardly.

Liftgates are usually fitted with cylindrical devices filled with pressurized gas at the sides to provide a spring assist when the door is raised. These cylindrical devices are commonly referred to as gas springs, gas struts, gas props, gas stays, and stay dampers. The gas springs generally occupy a position in which their axis is substantially parallel to the liftgate when the liftgate is closed. In this closed position the moment arm of the gas springs is quite small. Manual effort is therefore required to both raise and lower the liftgate even though the gas springs aid lifting and gravity aids lowering. Manual operation necessitates operator presence at the liftgate for operation, which can be undesirable during inclement weather and may be difficult for some people.

Many vehicles are currently incorporating powered actuators to automatically open and close the liftgates. However, incorporating known powered actuators into the liftgate has been problematic due to the kinematics involved and the relatively large and heavy liftgates. Further, the powered actuator typically requires a rather complex mechanical override mechanism which allows the liftgate to be manually opened and closed.

Accordingly, it is desirable to provide a power operator for a liftgate which enables remote operation to both raise and lower the liftgate. It is further desirable to provide a power liftgate actuator that facilitates manual operation if the power operator becomes inoperative.

SUMMARY OF THE INVENTION

The power operating system according to the present invention provides an actuator to automatically operate a vehicle liftgate. Each actuator includes a gas spring and a linear electric motor mounted thereto along a common axis. A connector located at each end of the gas spring mounts the gas spring between the vehicle and the liftgate.

The linear electric motor includes a linear stator and a slidable rotor which is drivable relative to the linear stator. The slidable rotor is attached to a cylinder end of a gas spring from which the gas spring shaft extends. By activating the linear electric motor, the rotor moves along the linear stator to drive the actuator between an extended position and a retracted position. The power operating system thereby provides automatic remote operation of the liftgate. Moreover, when power is unavailable to or removed from the linear electric motor, the liftgate may still be manually opened and closed in the conventional manner. No complicated mechanical or electrical override is required.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
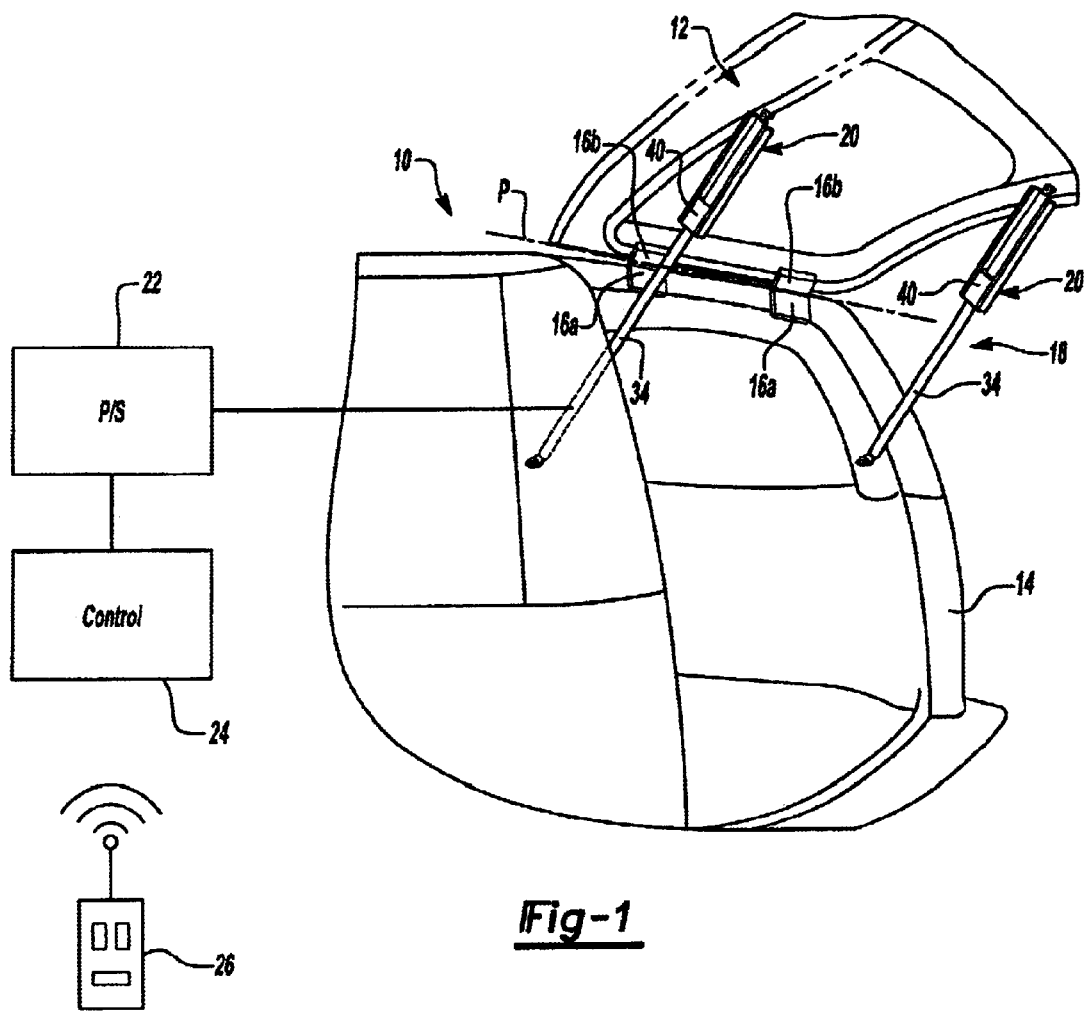
FIG. 1 is a general perspective view of a vehicle having a vehicle liftgate and a power operating system according to the present invention.

FIG. 1 illustrates a general perspective view of a vehicle 10 having a liftgate 12. Horizontal hinge assemblies 16 attach the liftgate to the aft end 14 of the vehicle 10. Although liftgate disclosed in the illustrated embodiment is a single door horizontal opening liftgate, it should be understood that other vans, station wagons, pick-up, and SUV movable closures will also benefit from the present invention. Moreover, other applications which require remote operation of a member will benefit from the present invention.

Hinge assemblies 16 have hinge portions 16a that are secured to the vehicle 10 and hinge portions 16b that are secured to the liftgate 12. Hinge portions 16a are attached to hinge portions 16b so that liftgate 12 pivots about a pivot axis indicated at P between a raised open position and a closed position. Pivot axis P is generally horizontal and liftgate 12 is generally permitted to pivot over 90 degrees.

Liftgate 12 is opened and closed by a power operating system 18 that includes two actuators 20. Actuators 20 are laterally spaced from each other and near the respective vertical body pillars at the aft end 14 of vehicle 10 that define the rear opening that is closed by lift gate 12. The actuators 20 are connected to a power supply (illustrated schematically at 22) such as a vehicle electrical system and a controller (illustrated schematically at 24) such as a vehicle computer. The controller 24 preferably receives commands from a remote (illustrated schematically at 26) such as a key fob which is operable to transmit open and close commands as is well known.

Figure 2:
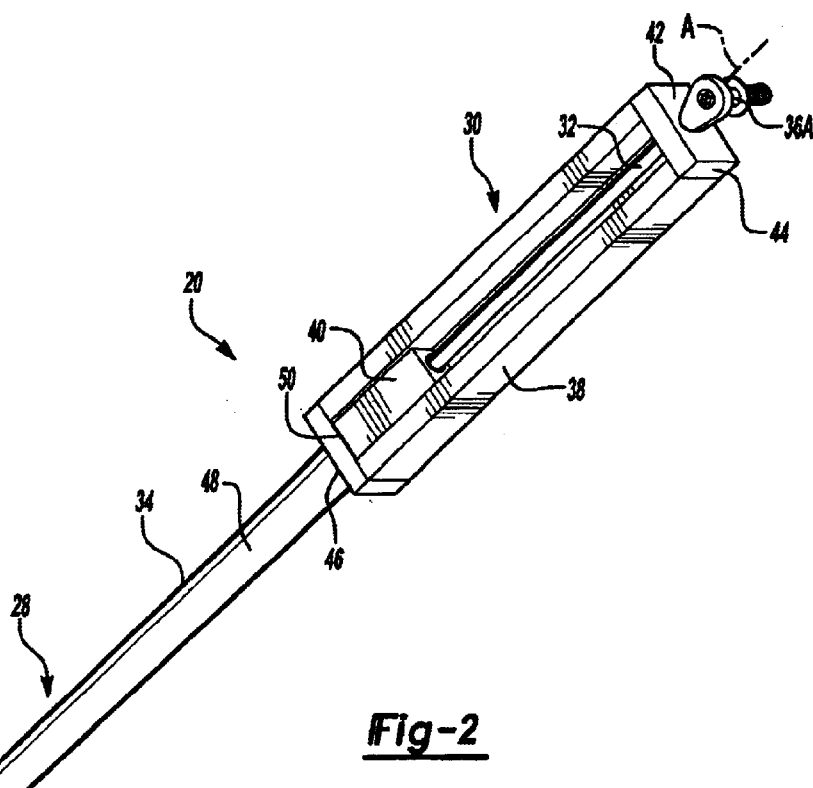
FIG. 2 is an expanded view of a powered actuator in an extended position.

Referring to FIG. 2, each actuator 20 preferably includes a gas spring 28 and a linear electric motor 30 mounted thereto along a common axis A. It should be understood that other struts, springs and telescopic biasing members will benefit from the present invention. The gas spring 28 includes a shaft 32 which telescopes in an out of a gas cylinder 34. The shaft 32 is biased toward the extended position to provide a spring assist or counter balance to the liftgate 12 (FIG. 1). A connector 36a, 36b is located at each end of the gas spring 28 so that mounting points of vehicle liftgates will also benefit from the present invention. That is, the present invention is readily mountable to current vehicles.

The linear electric motor 30 includes a linear stator 38 and a slidable rotor 40 which is drivable relative to the linear stator 38. Detailed operation of a linear electric motor is well known and will only be generally described herein. Further, a cover (not shown) preferably protects the linear electric motor 30 from the environment. The linear stator 38 is generally U-shaped in cross-section to receive the slidable rotor 40 therein. One end of the linear stator 38 is mounted to an end 42 of the shaft 32 by a bracket 44 or the like which attaches adjacent the connector 36a. The opposite end of the linear stator 38 is preferably slidably mounted to the gas cylinder 34 by a bracket 46 having an aperture 48 which allows the gas cylinder 34 to slide therethrough.

Figure 3:
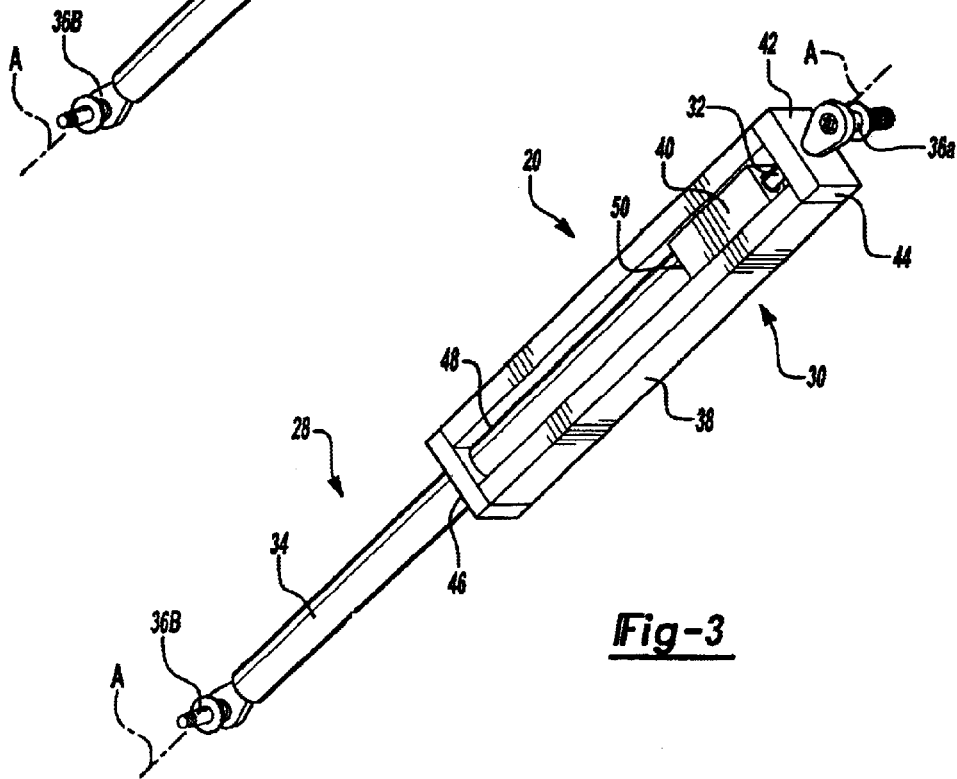
FIG. 3 is an expanded view of a powered actuator in a retracted position.

The slidable rotor 40 is attached to a cylinder end 50 of the gas cylinder 34 from which the shaft 32 extends. By activating the linear electric motor 30, the rotor 40 moves along the linear stator 38 to drive the actuator 20 between an extended position (FIG. 2) and a retracted position (FIG. 3). Preferably, the linear electric motor 30 exerts sufficient force to hold a liftgate in any given position along the path of movement, the force to overcome friction, and the force required to accelerate the liftgate during liftgate closing. The power operating system thereby remotely opens and closes the liftgate 12. Moreover, when power is unavailable to or removed from the linear electric motor 30, the liftgate 12 may still be manually opened and closed in the conventional manner. No complicated mechanical or electrical override is required.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An actuator assembly, comprising:
    a telescopic gas spring defining an axis, said gas spring comprising a shaft and a gas cylinder;
    a linear electric motor comprising a slidable rotor external to said gas cylinder and a stator attached to said telescopic gas spring along said axis such that operation of said linear electric motor drives said telescopic gas spring between an extended and a retracted position.

2. The actuator assembly as recited in claim 1, wherein said telescopic gas spring is biased toward said extended position.

3. The actuator assembly as recited in claim 1, wherein said stator comprises a substantially U-shape in cross section.

4. The actuator assembly as recited in claim 1, further comprising a controller in communication with said linear electric motor to drive said telescopic member between said extended and said retracted position.

5. The actuator assembly as recited in claim 4, further comprising a remote to transmit a position signal to said controller.

6. The actuator assembly as recited in claim 1, wherein said stator telescopes over said gas cylinder.

7. The actuator assembly as recited in claim 1, wherein said stator is fixed adjacent an end segment of said shaft.

8. A vehicle closure member, comprising:
    a gas spring defining an axis, said gas spring biased toward an extended position, one end of said gas spring mounted to a vehicle liftgate and an opposite end of said gas spring mounted to a vehicle body, said gas spring movable between said extended position and a retracted position; and
    a linear electric motor attached to said gas spring along said axis such that operation of said linear electric motor drives said gas spring between an extended and a retracted position.

9. The vehicle closure member as recited in claim 8, wherein said linear electric motor comprises a slidable rotor mounted to a cylinder of said gas spring.

10. The vehicle closure member as recited in claim 9, wherein said slidable rotor is drivable along a stator having a substantially U-shape in cross section.

11. The vehicle closure member as recited in claim 8, further comprising a controller in communication with said linear electric motor to drive said telescopic member between said extended and said retracted position.

12. The vehicle closure member as recited in claim 11, further comprising a remote to transmit a position signal to said controller.

13. The vehicle closure member as recited in claim 8, wherein said linear electric motor comprises a slidable rotor mounted to a stator which telescopes over a gas cylinder.

14. The vehicle closure member as recited in claim 8, wherein said gas spring comprises a shaft and a gas cylinder and said linear electric motor comprises a slidable rotor drivable along a stator fixed adjacent an end segment of a shaft.

15. A method of actuating a closure member having a gas spring comprising the steps of:
    (1) attaching the linear electric motor comprising a slidable rotor and a stator to a gas spring along a common axis, said slidable rotor external to the gas spring,
    (2) operating the linear electric motor to drive the gas spring between a retracted and an extended position; and
    (3) driving the gas spring with the linear electric motor to move the closure member between an open and a closed position.

16. A method of actuating a closure member as recited in claim 15, further comprising the step of counterbalancing the closure member with the gas spring.

17. A method of actuating a closure member as recited in claim 15, further comprising the step of operating the linear electric motor to drive the closure member to a locked position.

18. A method of actuating a closure member as recited in claim 15, further comprising the step of operating the linear electric motor to hold the closure member in a desired position.

19. A method of actuating a closure member as recited in claim 15, further comprising the step of remotely actuating the linear electric motor.

20. A method of actuating a closure member as recited in claim 15, wherein said step 2) further comprises telescoping the stator over the gas cylinder.

21. A method of actuating a closure member as recited in claim 15, wherein said step 1) further comprises fixing the stator adjacent an end segment of a shaft extending from the gas cylinder.

22. A method of actuating a closure member as recited in claim 15, wherein said step 1) further comprises fixing the rotor adjacent an end segment of the gas cylinder.

\* \* \* \* \*